Jan. 13, 1970  R. H. WELKER ET AL  3,488,852
INSPECTION APPARATUS
Filed Aug. 11, 1967  2 Sheets-Sheet 1
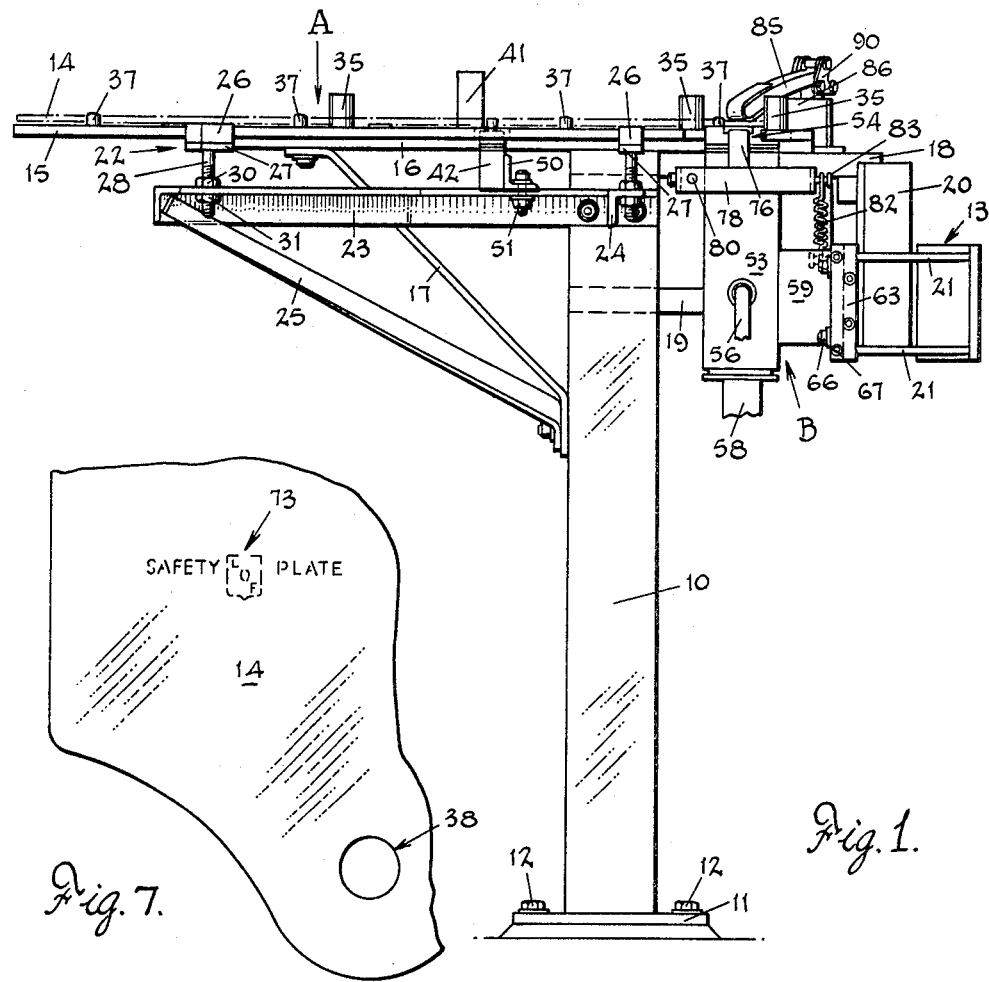
Fig. 1.
Fig. 7.
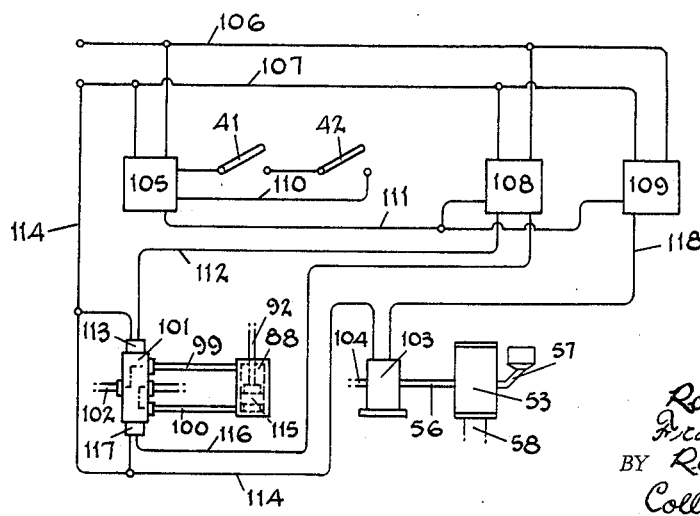
Fig. 8.
INVENTORS
Robert H. Welker,
Frank J. Carson and
BY Robert J. Schroder
Collins & Oberlin
ATTORNEYS Jan. 13, 1970    R. H. WELKER ET AL    3,488,852
INSPECTION APPARATUS
Filed Aug. 11, 1967    2 Sheets-Sheet 2
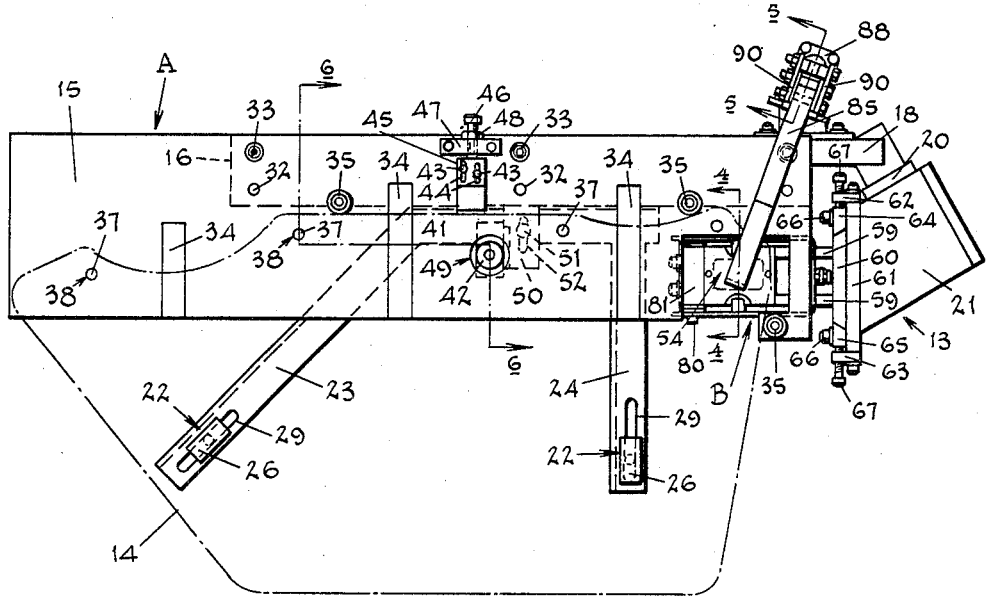
INVENTORS
Robert H. Welker,
Frank J. Casson and
BY Robert J. Schroder
Collins & Oberlin
ATTORNEYS

# United States Patent Office 3,488,852
Patented Jan. 13, 1970

3,488,852
INSPECTION APPARATUS
Robert H. Welker, Perrysburg, and Frank J. Carson and Robert J. Schroder, Toledo, Ohio, assignors to Libbey-Owens-Ford Glass Company, Toledo, Ohio, a corporation of Ohio
Filed Aug. 11, 1967, Ser. No. 660,120
Int. Cl. G01b 5/25
U.S. Cl. 33—1                                          6 Claims

ABSTRACT OF THE DISCLOSURE

Apparatus for inspecting drilled glass sheets in which proper hole location is determined by placing the sheets over pins arranged in a predetermined hole pattern. Correct location of the holes relative to one another allows the sheet surface to close one switch while correct location of the holes relative to the adjacent edge of the sheet allows the sheet edge to close a second switch in series with the first. The simultaneous closing of both switches energizes a marking device which applies an identifying mark to the sheet; therefore, the operation of the marking device provides an immediate visual indication of proper hole location and afterward, the presence of the mark identifies the sheet as having been properly drilled.

---

The present invention relates generally to the inspection of glass sheets and more particularly to an improved apparatus for inspecting or checking drilled glass sheets during the processing thereof.

Automobile side windows, or sidelights, and ventilators are conventionally fabricated by pattern-cutting plate glass blanks and then tempering, or in some cases bending and tempering the pattern cut sheets. In current automobile design, these windows are attached to their operating mechanisms through a hole or series of holes along one edge of the glass sheet, requiring that an additional drilling operation be included in the fabricating process. A typical sidelight, for example, may have four holes, drilled along its bottom edge. Since these holes must be properly aligned with respect to the corresponding mounting means associated with the operating mechanism the sheets must be inspected to insure that the holes are correctly located with respect to one another as well as with respect to the edge of the sheet.

In the tempering process, the glass sheet is first heated to its softening point and then chilled rapidly, developing a compressive stress in the surface layers of the sheet. The hardness thus resulting renders the glass substantially unworkable; therefore, it is mandatory that all fabricating operations and the inspection procedures associated with them be effected prior to tempering.

In order to achieve the high volume productioin required in the fabrication of automobile window glass it is important to combine as many of the above fabricating and inspection procedures as possible in order to approach a continuous production process. In the past, the procedures prior to bending and/or tempering, such as cutting and drilling and their associated inspections have been accomplished in separate operations thus requiring a certain amount of handling and storage between operation. Because of this necessity for handling and storage, additional marking steps have been required to clearly indicate the successful completion of the various fabricating operations and their associated inspections.

The present invention contemplates combining the procedure of checking or inspecting the drilled mounting holes for proper location with a procedure for applying to each sheet an identifying mark which is generally in a form designating the particular type of glass.

It is customary to apply the above marking at some point in the fabrication process prior to tempering. Since the tempering process does not change the optical properties of the glass thereby making it impossible to determine that a glass sheet has been tempered by ordinary visual means, it has become a practice to apply these identification markings immediately prior to tempering at the entrance to the tempering furnace so that in subsequent handling the presence of the marks provides an immediate indication that the sheets have been tempered.

By combining these operations, the inherent requirement of both processes for proper location of the glass sheet within the respective checking and marking devices can be satisfied by a single set of locating means thereby eliminating a significant amount of equipment and handling with consequent reduction in the scratching or marring of the sheet surfaces. Also, by using a mark which is necessarily put on all sheets of a particular design for commercial identification purposes the need for additional marking procedures and apparatus to identify properly drilled sheets is eliminated.

It is therefore an important object of this invention to provide apparatus for checking drilled glass sheets for proper hole location.

Another object of the invention is to accomplish the above checking function in combination with apparatus for applying an identification marking to the glass sheets.

Another object of the invention is to provide checking and marking apparatus of the above character in which proper hole location is determined automatically upon placement of the sheet on an appropriate checking surface.

Another object of the invention is to provide apparatus of the above character in which the marking device is operated automatically upon determination of proper hole location.

Other objects and advantages of the invention will become more apparent during the course of the following description when taken in connection with the accompanying drawings.

In the drawings, wherein like numerals are employed to designate like parts throughout the same:

FIG. 1 is a front elevation of one embodiment of an inspection apparatus constructed in accordance with the present invention;

FIG. 2 is a plan view of the inspection apparatus showing a glass sheet in checking position thereon;

FIG. 3 is a partial side elevation of the inspection apparatus;

FIG. 4 is a fragmentary cross-sectional view taken along line 4—4 of FIG. 2, showing details of the marking device;

FIG. 5 is a fragmentary cross-sectional view taken along line 5—5 of FIG. 2, showing a detail of the sheet clamping mechanism associated with the marking device.

FIG. 6 is a fragmentary cross-sectional view taken along line 6—6 of FIG. 2, showing a glass sheet in contact with the various checking devices of the present invention;

FIG. 7 is a partial plan view of a drilled glass sheet showing a typical marking; and FIG. 8 is a schematic diagram of the electrical control system for effecting automatic operation of the inspection apparatus.

Referring now to the drawings, the embodiment of the invention illustrated generally in FIGS. 1 and 2 is adapted to be used in conjunction with a bending and/or tempering furnace employed in the production of automobile sidelights. When utilized in this manner, the inspection apparatus is located at the entrance end of the furnace and glass sheets which have been pattern-cut and drilled are transported to the checking station where they are inspected for proper drilling, and placed directly on a conveyor which carries them into the furnace.

The inspection apparatus consists principally of a checking surface designated generally by the letter A and a marking device designated generally by the letter B. The entire apparatus is supported by a pedestal 10 which is bolted to the floor by means of a base member 11 and bolts 12 and may also be attached directly to the framework of the furnace (not shown) by means of a mounting flange assembly 13.

The checking function is carried out by placing glass sheets 14 to be inspected on a checking table 15 which is supported by a support plate 16 surmounting the pedestal 10 and fixed thereto. An auxiliary brace 17 connects the support plate 16 and the pedestal 10 to further support the outermost end of the plate.

The pedestal 10 and mounting flange assembly 13 are connected together by horizontal bars 18 and 19 which are secured to the pedestal and to an intermediate bracket 20 which is fixed to a pair of webs 21 which space the mounting flange assembly from the furnace framework.

While the glass sheet is supported partly by the table 15 when it is in checking position most of its weight is carried by a pair of support pads 22 which are adjustably mounted on outrigger brackets 23 and 24 attached to the pedestal 10 such that they are parallel to but slightly lower than table 15. The longer bracket 23 is braced by a member 25 which is fastened near the outermost end of bracket 23 and inclined downward toward the pedestal 10 where it is attached along with brace 17.

Each support pad 22 consists of a block of a resilient, non-abrasive material 26 which is bonded or otherwise attached to a solid backing plate 27. A threaded member 28 projects from the bottom of plate 27 and is received in slot 29 near the outward ends of each outrigger support 23 and 24. The support pads are secured in their slots by pairs of locking nuts 30 and 31. By adjusting the support pads 22 as to their height above the outriggers 23 and 24 and as to their location within the slots 29, the inspection apparatus can be adapted for use with sheets of different outline and arrangement of holes.

The checking table 15 serves as a mounting plate for the locating pins and stops which comprise the checking members of the apparatus. Since these members are arranged to suit a particular design of glass sheet a different table is required for each design.

For this reason, the table is made readily removable from its support 16, being fastened thereto by means of locating pins 32 and bolts 33. Parts of the table are cutaway to provide for location of the marking device B and a switch 42 associated with the marking device which will be more fully described hereinafter. To prevent marring of the glass sheets during inspection, thin strips 34 of a non-abrasive material are fastened to the table and spaced to support the glass sheet evenly in conjunction with the support pads 22.

Glass sheets 14 are positioned for inspection on the checking table 15 against stops 35 which are arranged in accordance with the shape of the sheets. The stops are made of a solid, non-abrasive material, such as nylon, and are fastened to the table by bolts 36 which are recessed within the stops in order to insure that only the non-abrasive surface of the stops will contact the glass.

The checking function of the invention is accomplished by means of cylindrical protrusions in the form of locating pins 37 which are arranged relative to one another and relative to the stops 35 so that when the sheet is positioned against the stops 35, the locating pins 37 will be received in the mounting holes 38 which have been drilled in the glass sheet. The pins 37 are fastened to the table 15 by screws 39 which protrude through the table from the bottom and are received in threaded holes in each pin such that only the pin is exposed to the glass. The pins are made of a solid, non-abrasive material, such as nylon and in order to insure precise location of the pins, they are piloted in shallow spotfaces 40 in the surface of the table.

The stops 35, being fairly large absorb any lateral forces which tend to be applied upon initial placement of the glass sheets on the checking surface thus preventing damage and undue wear to the locating pins 37 which are necessarily small to suit the drilled holes.

To insure the detection of improperly drilled sheets, and the proper identification of properly drilled ones, two switches 41 and 42 are provided to control the operation of the marking device B and which can be closed only if a glass sheet is properly drilled.

Switch 41 is mounted on the table 15 in position to be engaged by an edge of the glass sheet 14, as the sheet is placed against the stops 35 and over the pins 37 if the holes are correctly spaced from the edge of the sheet. To provide precise positioning the switch mounting screws 43 are received in slots 44 in the switch mounting bracket 45 allowing the switch to be moved horizontally by an adjusting screw 46, which is threaded into a block 47 fastened to the table and which bears against the mounting bracket 45. Once the proper position of the switch has been established, the switch is secured by tightening screws 43 and locking the adjusting screw by tightening a nut 48 against the block 47.

Switch 42 is mounted beneath table 15 and has an actuating plunger that protrudes through a hole 49 on the table to a level corresponding to the surface of strips 34 such that it will not close unless the glass sheet 14 lies flat against the strips 34 by virtue of the holes 38 being properly aligned with pins 37. The switch is adjustably mounted by means of a bracket 50 which is bolted to the outrigger bracket 23. A mounting bolt 51 is received in a slot 52 in the bracket 50 to provide a horizontal adjustment of the switch. Vertical adjustment is accomplished by adding or removing spacers between the switch and the support member.

Electrically, the switches 41 and 42 are connected in series so that both switches must be closed in order for marking device B to operate. Thus, the glass sheet must not only have been drilled with the holes correctly positioned with respect to one another so that the sheet will fit over pins 37 and close switch 42, but the holes must also be correctly located with respect to the edge of the glass in order for switch 41 to be closed at the same time. Failure of the marking device to operate alerts the operator that the sheet has not been properly drilled.

The marking device B shown in illustrated embodiment is of the type which etches the desired pattern onto the glass by means of sandblasting. The sandblasting device is composed principally of a chambered housing or box 53, a stencil assembly 54 surmounting the housing, a nozzle 55 which is located within the chamber to direct air up toward the stencil and is connected to an air supply through a pipe 56, and supply and return pipes 57 and 58 respectively, connecting the chamber with an abrasive reservoir (not shown).

The chamber formed by the housing 53 acts as a mixing chamber for air and abrasive in the sandblasting process.

The housing is adjustably mounted directly to the flange assembly 13 independently of the pedestal 10 by webs 59 which are fixed to the side of the housing and to a mounting plate 60. The plate 60 is received in a channel formed by a vertical support plate 61 secured to the webs 21 of mounting flange assembly 13 and side plates 62 and 63 bolted to plate 61. The vertical edges of plate 60 are cut at angles complementary to angles cut in clamping members 64 and 65 which are received in the above channel on either side of plate 60 and fastened to bottom plate 61 by bolts 66.

Adjustment is accomplished by sliding the marking device B up or down to the desired position and then locking it in place by tightening bolts 66 in the clamping members 64 and 65 and bolts 67 which go through the channel side plates 62 and 63 and bear against the clamping members. The device is mounted so that the stencil assembly 54 is horizontally disposed with respect to the surface of the table 15 and so that the top of the stencil assembly 54 is flush with the top of the strips 34.

The stencil assembly 54 includes a resilient membrane 68 bonded to an abrasive resistant backing plate 69 and providing the stencil area for the desired identification mark. A resilient spacer 70 is interposed between the backing plate 69 and the housing 53 to form a seal when the marking device is in operation. A rectangular hole 71 through the backing plate and spacer, coincides with a similar hole 72 in the top wall of the housing 53 when the stencil is mounted in operable position and provides a conduit for air and abrasive. The desired identification mark, for example, the trademark 73 shown in FIG. 7, is cut into the membrane 68 in an area corresponding to the rectangular hole 71.

To allow for membrane wear due to the abrasive impinging on it and to provide for the use of various designs, the stencil assembly 54 is mounted on the housing 53 for easy removal and replacement. The backing plate 69 is aligned on the housing by means of pins 74 pressed into the housing 53 and received in holes 75 in the backing plate. The backing plate is secured to the housing by a pair of clamps 76 which are received in recessed areas 77 in the backing plate 69. The clamps are bent adjacent their upper ends and extend downward alongside the housing 53 where they are pivotally fastened to a U shaped bracket 78 by rivets 79. The open end of the U shaped bracket 78 is pivotally mounted on a pin 80 which is received in a block 81 bolted to one side of the housing 53 and located such that the U shaped bracket is substantially horizontal when the stencil assembly is secured to the housing. A spring 82 provides the force necessary to hold the stencil assembly down against the housing. One end of the spring is secured to the housing mounting plate 60 while the other end is hooked over a pin 83 projecting from the web portion 84 of the U shaped bracket 78. When it is desired to change the stencil assembly 54, the spring 82 is removed from pin 83 and the bracket 78 is swung upward pivoting around pin 80 until the clamps 76 are clear of the stencil assembly.

When the sandblasting device is in operation, air is introduced into one side of the chamber in housing 53 through supply pipe 56. The abrasive material is introduced into the opposite side of the chamber 53 through supply pipe 57 and is returned to its reservoir through a return pipe 58 extending from the bottom of the housing 53. The air supply pipe ends in the nozzle 55 inside the chamber and the sandblasting is effected by the aspirating effect of the air on the abrasive material causing the abrasive to be drawn into the chamber and to impinge against the membrane 68 etching the desired identification onto the glass sheet 14 placed in position above the stencil. The air and abrasive material impinging against the membrane causes it to be forced upward against the bottom surface of the glass sheet 14; therefore, there is very little loss of abrasive and most of it is returned to its reservoir through the return pipe 58.

In order to insure that the sandblasted mark will be distinctly defined on the glass and to minimize the possibility of abrasive being forced between the table top and the glass, where it would scratch the surface of the glass sheet as said sheet is placed upon the table, it is important that the portion of the glass sheet being sandblasted be held in close engagement with the table and stencil during the actual sandblasting cycle.

For this purpose, a clamping arm 85 is provided to hold the glass sheet firmly against the stencil. The arm 85 is pivoted on a pin 87 carried by a bracket 86 bolted to the horizontal bars 18 and 19 which connect the mounting flange assembly 13 to the pedestal 10. The arm 85 is actuated, through a bellcrank and link system, by an air cylinder 88 which is also mounted on bracket 86 through a pivot bolt 89. The bellcrank 90 and link 91 consist of pairs of such members, one of each mounted on either side of arm 85 and bracket 86; however, only one of each member, as shown in FIG. 5, need be described. The ram 92 of air cylinder 88 is pivotally connected to one leg of the bellcrank 90 through a pin 93. The bellcrank 90 is pivoted at its center on bracket 86 through a pin 94 and the link 91 is pivoted to the opposite leg of the bellcrank through a pin 95 and a sleeve bearing 96, and to the arm 85 through a pivot pin 97.

When air is supplied to the lower end of the cylinder 88, the ram 92 moves upward causing the bellcrank 90 to rotate counterclockwise as viewed in FIG. 5, and the link 91 forces the free end of the arm 85 downward against the surface of the glass. The actuating mechanism thus provided causes the clamping arm to swing through a relatively large arc in response to a relatively short throw of the cylinder ram.

To prevent marring of the glass sheet, a resilient nonabrasive material 98 is applied over the end of the arm which contacts the glass.

Referring now to the control system shown in FIG. 8, the conditions illustrated depict the inspection apparatus as it is before a glass sheet is placed on checking surface A.

The cylinder 88 for actuating clamping arm 85 is connected by conduits 99 and 100 to a four-way valve 101 which is connected to a pressure source (not shown) by a conduit 102. The sandblasting chamber 53 is connected by conduit 56 to a valve 103 which is also connected to said pressure source through a conduit 104.

Electrically, the primary timer relay TR 105 is connected in series with source lines 106 and 107 and determines the duration of a complete checking and marking cycle by actuating the first and second secondary timer relays TR 108 and TR 109 respectively upon completion of a circuit through line 110 when switches 41 and 42 are both closed. TR 108 and TR 109 are also in series with source lines 106 and 107 and are actuated upon completion of a circuit through line 111 from the primary TR 105. Secondary TR 108 establishes the interval of time during which clamping arm 85 remains in engagement with glass sheet 14. Under the conditions illustrated in FIG. 8, a circuit is completed from source line 106 through TR 108, line 112, one side 113 of valve 101 and line 114 to source line 107 thereby connecting conduit 102 with conduit 99 causing pressure to be applied to the top of piston 115 of cylinder 88 and maintaining arm 85 in the up or disengaged position. Upon actuation of TR 108 by TR 105, this circuit is broken and a circuit completed from source line 106 through line 116, side 117 of valve 101 and line 114 to source line 107 thereby connecting conduit 102 with conduit 100 causing pressure to be applied to the bottom of piston 115 of cylinder 88 and causing arm 85 to engage a sheet of glass 14 for marking.

Secondary TR 109 establishes the relatively short interval of time required for application of the identifying mark, by completing a circuit from source line 106 through line 118, valve 103 and line 114 to source line 107, causing conduit 104 to be connected with conduit 56 and applying air to the chamber formed by the housing 53.

In a typical operational cycle, the drilled glass sheet is placed on the checking table 15 and aligned against the stops 35. If the sheet has been properly drilled, the mounting holes 38 therein will coincide with locating pins 37 and the edge of the sheet will contact switch 41. The sheet is then lowered until it lies flat against the strips 34 closing switch 42. Closing of the switches 41 and 42 actuates TR 105 which initiates the timed marking cycle by simultaneously energizing TR 108 and TR 109. TR 108 is set to immediately apply air to the bottom of piston 115 to cause clamping arm 85 to engage the glass sheet and to maintain this condition until TR 109 has caused the marking operation to be completed. TR 109 is set to allow sufficient time to insure that the glass is firmly clamped by arm 85 before opening the valve 103, Upon completion of sandblasting, TR 108 causes air to again be applied to the top of piston 115 causing arm 85 to be raised permitting the glass sheet to be removed from table 15. TR 105 is set to time out immediately upon completion of the above cycle and to allow sufficient time for removal of the glass sheet before it can be reactuated by closing of switches 41 and 42 in order to insure that inadvertent closing of these switches in handling the glass will not initiate another marking cycle.

The operation of the sandblasting device provides an operator with visual indication that the holes in the glass sheet have been properly drilled. If the holes are not properly drilled either or both of switches 41 and 42 will not close and the resulting inoperation of the sandblasting device will immediately alert the operator as to the improper drilling.

It is to be understood that the forms of the invention herewith shown and described are to be taken as illustrative embodiments only of the same and that various changes in the shape, size and arrangement of parts may be resorted to without departing from the spirit of the invention.

We claim:

1. Apparatus for inspecting drilled glass sheets, comprising a sheet supporting table surface; means for locating a sheet to be inspected in a predetermined position on said surface; at least one cylindrical protrusion upstanding from said table surface in a fixed position relative to said locating means, said fixed position corresponding to the desired location of a hole in said sheet; marking means for applying an identifying mark to at least one surface of said sheet; and switch means controlling said marking means responsive to alignment of a hole in said glass sheet with said protrusion to initiate the application of said mark, said switch means comprising a first switch engageable by an edge of the sheet and a second switch connected in series with the first and actuated by the surface of the sheet upon lowering thereof onto the table surface.

2. Apparatus for inspecting drilled glass sheets as claimed in claim 1, in which a plurality of protrusions are arranged on said table surface in a predetermined pattern relative to one another corresponding in location to a pattern of holes in a sheet to be inspected.

3. Apparatus for inspecting drilled glass sheets as claimed in claim 1 including means for clamping the sheet to the table surface during marking of said sheet.

4. Apparatus for inspecting drilled glass sheets as claimed in claim 3, in which said clamping means comprises an arm pivotally mounted for rocking movement in a vertical plane to move one end thereof toward and away from said sheet and engageable with the sheet surface opposite said marking means, and means for moving said arm into out of engagement with said sheet surface.

5. Apparatus for inspecting drilled glass sheets as claimed in claim 4, including control means responsive to alignment of the drilled hole in the sheet with said protrusion, comprising a timing unit operable to initiate a first operation moving said clamping arm to clamping position and a second operation actuating said marking means.

6. Apparatus for inspecting drilled glass sheets as claimed in claim 5, in which said timing unit comprises a primary timer and first and second secondary timers, said primary timer being operable to initiate operation of said first and second secondary timers, operation of said first secondary timer causing the clamping arm to move to sheet clamping position while operation of said second secondary timer causes the starting and stopping of the marking means while said clamping arm is in sheet clamping position said first secondary timer then operating to move said clamping arm out of sheet clamping position.

References Cited

UNITED STATES PATENTS

| 998,623 | 7/1911 | Lundgren | 101—317 |
| 3,352,817 | 7/1944 | Whitmer | 101—317 X |
| 3,402,662 | 9/1968 | Blair et al. | 101—306 X |

WILLIAM D. MARTIN, JR., Primary Examiner

U.S. Cl. X.R.

33—174, 180; 101—306